(12) United States Patent
Paisis (10) Patent No.: US 9,591,337 B1
(45) Date of Patent: Mar. 7, 2017

(54) POINT TO POINT MEDIA ON DEMAND

(75) Inventor: Michael A. Paisis, Marietta, GA (US)

(73) Assignee: Cox Communications, Inc., Atlanta, GA (US)

( * ) Notice: Subject to any disclaimer, the term of this patent is extended or adjusted under 35 U.S.C. 154(b) by 0 days.

(21) Appl. No.: 13/431,028

(22) Filed: Mar. 27, 2012

(51) Int. Cl.
*H04N 7/173* (2011.01)
*H04N 21/232* (2011.01)

(52) U.S. Cl.
CPC ................................ *H04N 21/232* (2013.01)

(58) Field of Classification Search
CPC ...... H04N 21/63; H04N 21/632; H04N 21/23; H04N 21/231; H04N 21/232
USPC .............................. 725/91, 54, 37, 38, 86–87
See application file for complete search history.

(56) References Cited

U.S. PATENT DOCUMENTS

| 2006/0008256 | A1* | 1/2006 | Khedouri | G06F 17/30038 386/234 |
| 2006/0149806 | A1* | 7/2006 | Scott et al. | 709/201 |
| 2007/0183342 | A1* | 8/2007 | Wong et al. | 370/252 |
| 2008/0141328 | A1* | 6/2008 | Weintraub | H04N 7/17318 725/134 |
| 2008/0155059 | A1* | 6/2008 | Hardin et al. | 709/218 |
| 2009/0119386 | A1* | 5/2009 | Busser et al. | 709/218 |
| 2009/0187588 | A1* | 7/2009 | Thambiratnam et al. | 707/102 |
| 2009/0254659 | A1* | 10/2009 | Li | H04N 7/17318 709/225 |
| 2010/0229222 | A1* | 9/2010 | Li | H04N 7/17318 726/5 |
| 2011/0126245 | A1* | 5/2011 | Chen et al. | 725/93 |

* cited by examiner

*Primary Examiner* — Farzana Hossain
(74) *Attorney, Agent, or Firm* — Merchant & Gould P.C.

(57) ABSTRACT

Reducing head end server demand for cable television/ services systems with point-to-point Media on Demand content delivery is provided. Upon receiving a request for media content, a content table may be requested from one or more neighboring network-connected devices to search for the requested content. If the requested content is found, the content may be provided to the requesting device from the neighboring device. If the requested content is not found on a neighboring device, a hub server station may be queried for the requested media content. The media content may be provided by the head end server if the content is not available on a neighboring device or the hub server. Embodiments may reduce demand on the head end server and free the head end server capacity for other uses.

20 Claims, 4 Drawing Sheets

POINT TO POINT MEDIA ON DEMAND

BACKGROUND

Many video content providers provide video-on-demand (VOD) services which allow customers to request certain video programming to be played on their video viewing devices via a network-connected device (e.g., a set-top box) at a time desired by the customer. For example, a customer may select a desired movie, documentary, educational film, and the like from a list of titles displayed on the customer's television set via a set-top box. Typically, requested video programming titles are streamed from a provider's head end or main server to a customer's network-connected device (e.g., set-top box) and video viewing device (e.g., television set) via a networked system, such as a cable system hub that services a number of individual cable customers. That is, in a cable television services system, each requested video programming title may be streamed from a cable system head end to the requesting customer.

As can be appreciated, streaming individual titles to individual customers from a head end server consumes significant processing capacity at the head end. Additionally, transmission of a requested title from a head end server to a servicing hub server may also consume a significant amount of transmission capacity between the head end and the servicing hub. The system head end may be tasked with other services. For example, the head end server may be tasked with traditional video television programming, television services, high speed internet access, electronic mail services, cable system management and maintenance services, and the like. As a result, use of the system head end server for VOD processing and transmission may be inefficient and burdensome on the head end server system.

It is with respect to these and other considerations that the present invention has been made.

SUMMARY

Embodiments of the present invention provide a point-to-point VOD system for reducing head end server demand. According to one embodiment, high demand media content including, but not limited to, video content, music, music downloads, video games, internet data streaming, etc., may be stored at provider system hubs or servers servicing multiple individual customers. For example, a customer may request a certain media content title and the content may be delivered from any number of hub servers containing the content to the customer rather than being delivered from the system's head end server to the customer. Embodiments may be utilized in various delivery platforms such as a cable television services platform, internet streaming through a broadband network, a digital subscriber line (DSL) network, Wi-Fi, satellite, etc.

According to another embodiment, point-to-point searching may be provided. One or more tables of neighboring network-connected devices according to location and other parameters may be received by an end-point device and utilized for finding a nearest neighboring device with a requested VOD title. End-point devices may include, but are not limited to, set-top boxes, desktop computers, laptop computers, tablet computers, mobile phones, smart phones, network-connected televisions, gaming devices, as well as other network-connected devices. Embodiments may be utilized for determining a most efficient method of retrieving content due to such factors as location, speed of download, etc., and for retrieving the desired content. If the request cannot be fulfilled with point-to-point set-top boxes or hub servers, the head end server may be used to fulfill the request.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

DETAILED DESCRIPTION

As briefly described above, embodiments of the present invention are directed to delivering media content utilizing point-to-point systems and methods regardless of the physical location of a consumer, an endpoint device with which content may be received, or a broadcasting method with which content may be delivered. When an individual user makes a request for media content to be delivered on demand, a search may be initiated for content previously requested by a neighboring (point-to-point) device within a given area (e.g., neighborhood, community, district, city, etc.,). The media content may then be retrieved and used by the requesting device.

Consider, for example, a subscriber to an on demand media content service desires to watch a specific movie. Upon requesting to watch this movie, for example, by selecting the movie title from a VOD menu displayed on the user's television, a search may be performed to determine if another nearby device has previously requested and received the movie content. If the requested movie is found, upon receiving permission to retrieve the content, the movie content may be retrieved and provided to the requesting subscriber. If the requested movie is not found on any peer devices, a hub server may be searched for the content. If the content is not found at the hub server, the content may be requested from the head end server.

These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents. Referring now to the drawings, in which like numerals refer to like elements throughout the several figures, embodiments of the present invention and an exemplary operating environment will be described.

Figure 1:
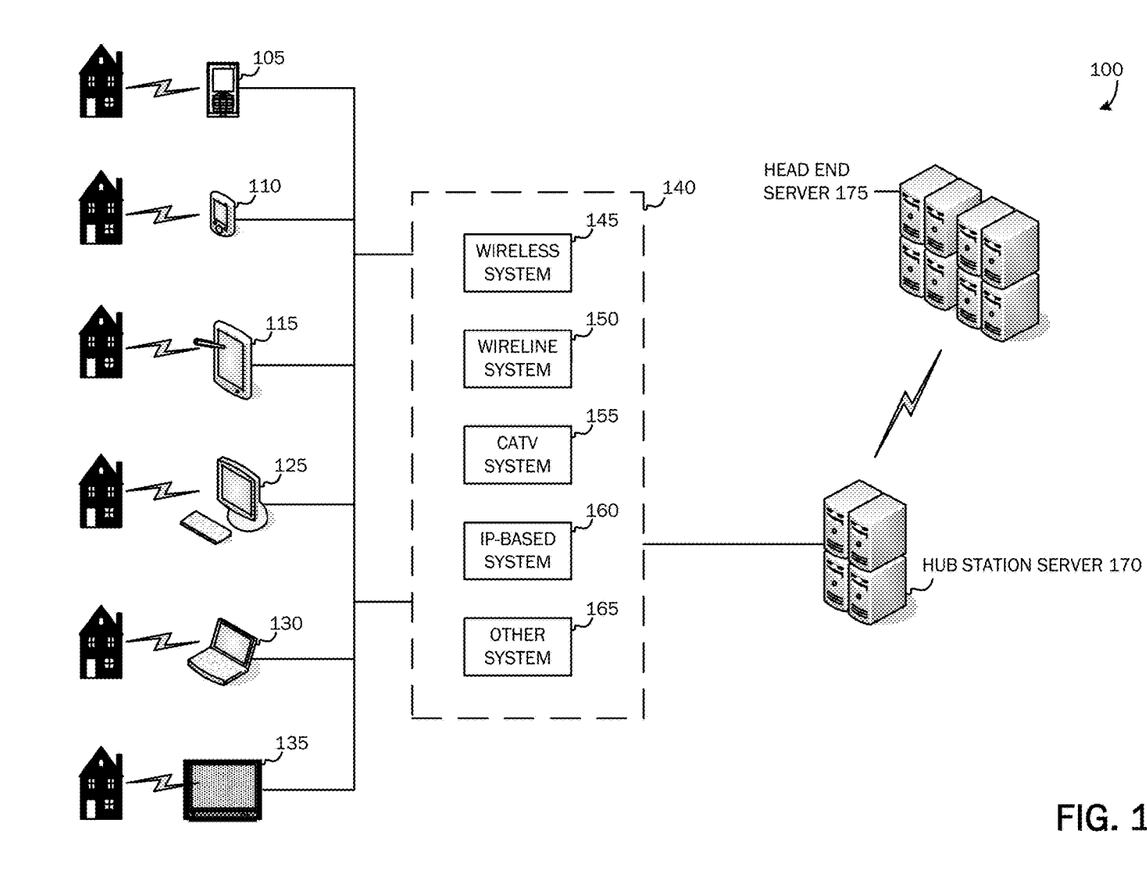
FIG. 1 is simplified block diagram illustrating a communication network architecture that serves as an exemplary operating environment for the present invention.

FIG. 1 is a simplified block diagram illustrating a communication network architecture that serves as an exemplary operating environment for the present invention. In FIG. 1, a variety of communications devices and systems are illustrated for which streaming media content may be applied according to the embodiments of the present invention. A variety of endpoint devices are illustrated including, but not limited to, wireless telephones 105, smart phones 110, tablet computers 115, personal computers 125, laptop computers 130, network-connected televisions (e.g., Internet televisions, televisions connected to a set-top box, etc.) 135, etc. to communicate with one or more remote applications or other endpoint devices via a communications network 140. As should be appreciated, the numerous endpoint devices illustrated in FIG. 1 may be utilized to send and/or receive communications in various operating environments according to various types of transmissions, including media content.

The network 140 is illustrative of one or more media content delivery systems through which the various endpoint devices/systems 105,110,115,125,130,135 may operate. For example, the wireless system 145 may be utilized for wireless voice, text and data transmissions. The wire-line system 150 may be utilized for wire-line voice, text and data transmissions. The Cable Television (CATV) system 155 may be utilized for provision of television services and data services. The IP-based system 160 may be utilized for any of a variety of Internet protocol-based services such as voice and data transmissions. Other systems 165 are illustrative of any number of other systems that may be utilized for providing communications between various endpoint devices with other endpoint devices, software applications and data repositories. In as much, a single combined system may be provided by a given service provider for providing multiple types of the aforementioned communications services, including media content. For example, a single services provider may offer television, wireless and wire-line telephone and data products or services.

Referring still to FIG. 1, a hub station server 170 may serve as a remote computerized system for delivering media content according to the embodiments of this invention. The hub station server 170 is illustrative of any suitable computing system (e.g., server computer) capable of sending, receiving, processing, verifying and storing data according to embodiments of the present invention. The hub station server 170 may be associated with any one or combination of the communications systems illustrated in the network 140 for maintaining and processing subscriber information, including but not limited to, products or services subscribed to, contract information, subscriber contact information, product/services usage data, as well as all necessary media delivery functionality.

According to embodiments, the hub station server 170 may be operable to receive a request for on-demand media content and to provide requested on-demand media content. The hub station server may not be limited to providing content from a single media content provider company, but may provide media content from a plurality of media content providers via various methods of electronic delivery. As can be appreciated, oftentimes, a hub server station 170 may be located farther away from a customer than other customers using the same hub. That is, other customers and their network-connected devices 105,110,115,125,130,135 may be located closer to a customer requesting media content than the hub server station 170.

Referring still to FIG. 1, the communication network architecture 100 includes a head end server 175. The head end server system may include hardware and software systems and may be operable to managing and distribute media content. In addition to distributing media content on demand, the head end 175 may be tasked with other services such as traditional video television programming, television services, high speed internet access, electronic mail services, cable system management and maintenance services, and the like. Embodiments may be utilized to offload on-demand processing and transmission to hub servers 170 and endpoint devices 105,110,115,125,130,135 and free processing capacity at the head end 175.

Embodiments of the present invention may be applied to various on demand applications including, but not limited to, media programming guide applications (e.g., television listings applications), web browser applications, gaming applications, media streaming applications, and the like.

Figure 2:
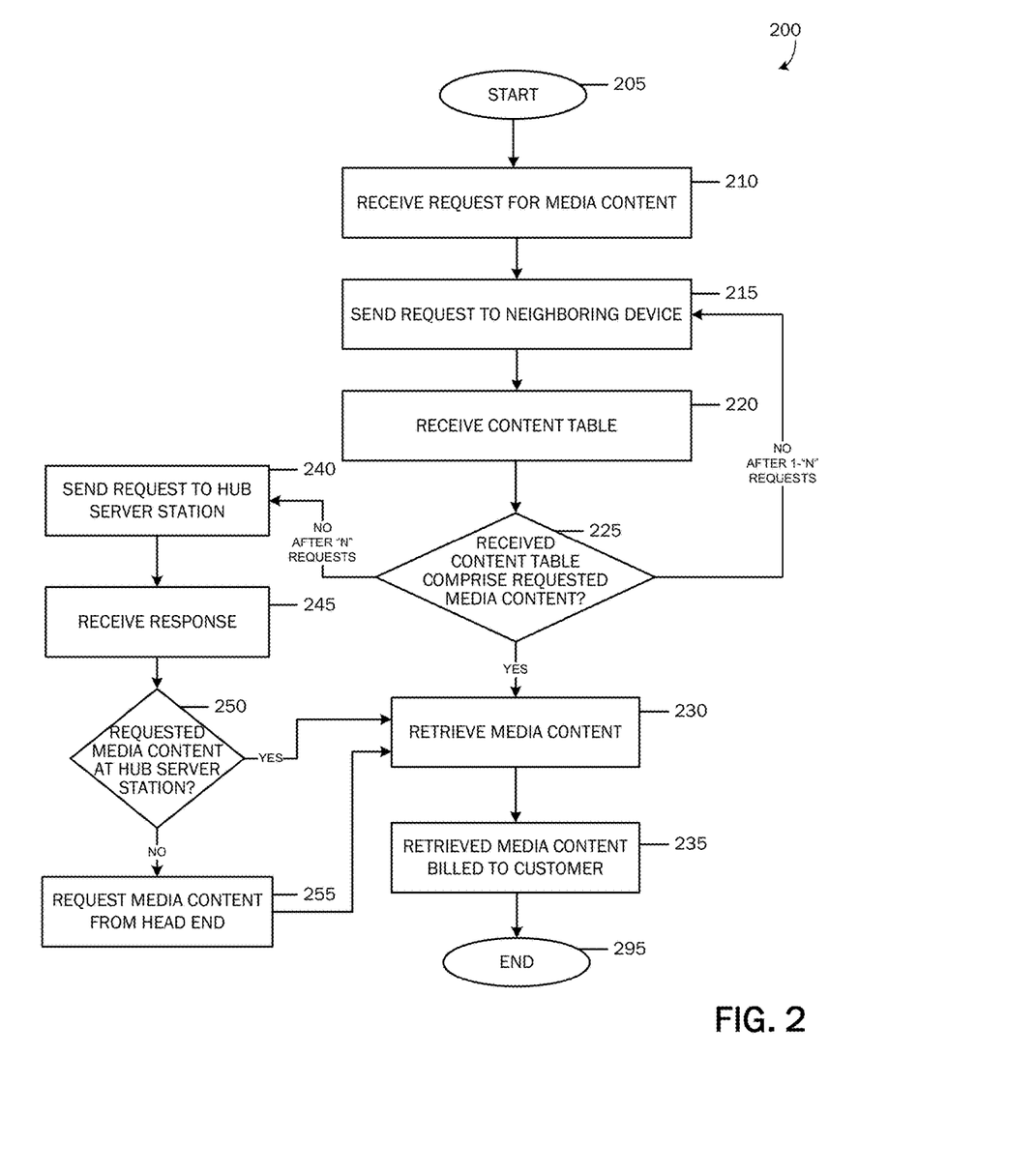
FIG. 2 is a flow diagram showing an illustrative routine for point-to-point media content delivery.

Referring now to FIG. 2, a process flow of a method for reducing head end server demand through a point-to-point media on-demand system is illustrated. The method 200 starts at OPERATION 205, and proceeds to OPERATION 210, where a request is received for media content. The media content may be one of various types of media including, but not limited to, video, audio, a game, and the like. A user may make a request via one of various endpoint devices, such as, but not limited to a set-top-box, personal computer, smart phone, tablet computer, gaming device, or other network connected device. For example, a user may select a movie that he would like to watch by selecting the movie title from a menu. When a user selects a piece of media content to watch, listen, play, etc., a request for the content is received.

Upon receiving a request for media content, the method 200 proceeds to OPERATION 215, where a request is sent to one or more neighboring peer nodes for a content table, wherein a peer node is an endpoint device 105,110,115,125, 130,135 that is attached to a network, and is capable of sending, receiving, or forwarding information over a communications channel. According to embodiments, a content table may include an index or database of media content previously downloaded by a device and its location. According to one embodiment, the request may be sent to a nearest router, which may direct the request to a nearest device. Neighboring devices may be devices located within a predetermined distance of the requesting device, within in a community, city, zone, or other geographical area.

At OPERATION 220, the requested content table may be received as a response. According to an embodiment, the received content table may be stored for future media content requests. At DECISION OPERATION 225, a determination may be made to determine if the received content table comprises the requested media content. If the content table comprises the requested media content, at OPERATION 230, the media content may be retrieved from the associated device. Media content may be retrieved by various methods. For example, the media content may be downloaded from one STB to a requesting STB, streamed in real time, or downloaded from any number of sources consistent with embodiments of this invention. At OPERATION 235, the customer may be billed for the received on demand media content. Billing for consumption of media on demand may be done individually or as part of a bundled package of purchased services from a media content provider.

If a determination is made at DECISION OPERATION 225 that the received content table does not comprise the requested media content, the method 200 may return to OPERATION 215 and the request may be sent to the next nearest device. OPERATIONS 215-225 may be repeated "N" number of times where "N" may be the number of time until the requested media content is found, until a predetermined number of requests have been sent, or after searches have been made within a predetermined radius without finding the requested media content.

If the requested media content is not found on any neighboring devices, the method 200 may proceed to OPERATION 240 where the request may be sent to a hub server station 170. At OPERATION 245, a response from the hub server station 170 is received. At DECISION OPERATION 250, a determination is made to determine if the requested media content is present at the hub server station 170. If the requested media content is present at the hub server station, the method may proceed to OPERATION 230 where the requested media content is retrieved. If it is not present, then the method 200 proceeds to OPERATION 255, where the request is sent to the head end server 175. At OPERATION 230, the requested content may be provided to the requesting device. The method 200 ends at OPERATION 295.

Figure 3:
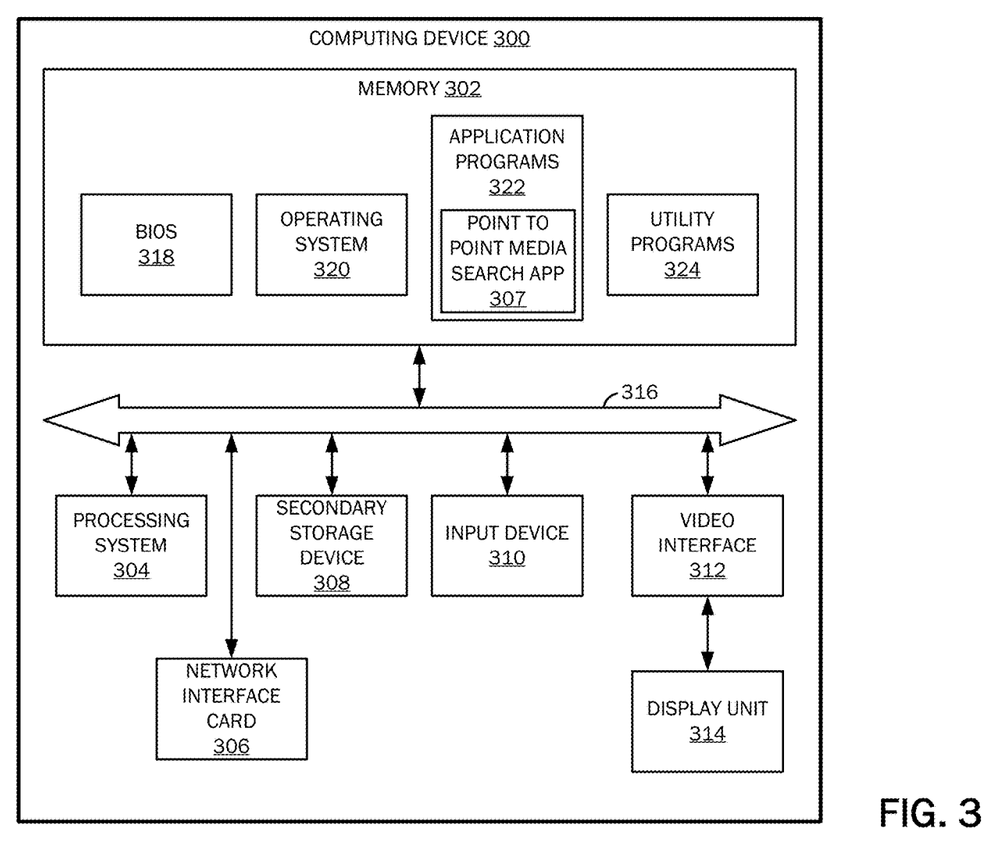
FIG. 3 is a simplified block diagram of a computing device with which embodiments of the present invention may be practiced.

FIG. 3 is a block diagram illustrating an example computing device 300 with which embodiments of the present invention may be implemented. In some embodiments, the endpoint devices 105,110,115,125,130,135, the hub server station 170, and/or the head end server 175 may be implemented using one or more computing devices like the computing device 300. It should be appreciated that in other embodiments, the endpoint devices 105,110,115,125,130,135, the hub server station 170, and/or the head end server 175 are implemented using computing devices having hardware components other than those illustrated in the example of FIG. 3.

Computing devices are implemented in different ways in different embodiments. For instance, in the example of FIG. 3, the computing device 300 comprises a memory 302, a processing system 304, a network interface 306, a secondary storage device 308, an input device 310, a video interface 312, a display unit 314, and a communication medium 316. In other embodiments, the computing device 300 is implemented using more or fewer hardware components (e.g., a video interface, a display unit, or an input device).

The memory 302 includes one or more computer-readable storage media capable of storing data and/or computer-executable instructions. In various embodiments, the memory 302 is implemented in various ways. For example, the memory 302 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

According to embodiments, the term computer-readable media includes communication media and computer-readable storage media. Communication media include information delivery media. Computer-executable instructions, data structures, program modules, or other data in a modulated data signal, such as a carrier wave or other transport mechanism, may be embodied on a communications medium. The term modulated data signal describes a signal that has one or more characteristics set or changed in such a manner as to encode information in the signal. For example, communication media can include wired media, such as a wired network or direct-wired connection, and wireless media, such as acoustic, radio frequency (RF), infrared, and other wireless media.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, program modules, computer-executable instructions, or other data.

The processing system 304 includes one or more processing units, which may include tangible integrated circuits that selectively execute computer-executable instructions. In various embodiments, the processing units in the processing system 304 are implemented in various ways. For example, the processing units in the processing system 304 can be implemented as one or more processing cores. In this example, the processing system 304 can comprise one or more Intel Core microprocessors. In another example, the processing system 304 can comprise one or more separate microprocessors. In yet another example embodiment, the processing system 304 can comprise Application-Specific Integrated Circuits (ASICs) that provide specific functionality. In yet another example, the processing system 304 provides specific functionality by using an ASIC and by executing computer-executable instructions.

The computing device 300 may be enabled to send data to and receive data from a communication network via a network interface card 306. In different embodiments, the network interface card 306 is implemented in different ways, such as an Ethernet interface, a token-ring network interface, a fiber optic network interface, a wireless network interface (e.g., WiFi, WiMax, etc.), or another type of network interface.

The secondary storage device 308 includes one or more computer-readable storage media, and may store data and computer-executable instructions not directly accessible by the processing system 304. That is, the processing system 304 performs an I/O operation to retrieve data and/or computer-executable instructions from the secondary storage device 308. In various embodiments, the secondary storage device 308 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 310 enables the computing device 300 to receive input from a user. Example types of input devices include, but are not limited to, keyboards, mice, trackballs, stylus input devices, key pads, microphones, joysticks, touch-sensitive display screens, and other types of devices that provide user input to the computing device 300.

The video interface 312 outputs video information to the display unit 314. In different embodiments, the video interface 312 is implemented in different ways. For example, the video interface 312 is a video expansion card. In another example, the video interface 312 is integrated into a motherboard of the computing device 300. In various embodiments, the display unit 314 can be a an LCD display panel, a touch-sensitive display panel, an LED screen, a projector, a cathode-ray tube display, or another type of display unit. In various embodiments, the video interface 312 communicates with the display unit 314 in various ways. For example, the video interface 312 can communicate with the display unit 314 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 316 facilitates communication among the hardware components of the computing device 300. In different embodiments, the communications medium 316 facilitates communication among different components of the computing device 300. For instance, in the example of FIG. 3, the communications medium 316 facilitates communication among the memory 302, the processing system 304, the network interface card 306, the secondary storage device 308, the input device 310, and the video interface 312. In different embodiments, the communications medium 316 is implemented in different ways, such as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 302 stores various types of data and/or software instructions. For instance, in the example of FIG. 3, the memory 302 stores a Basic Input/Output System (BIOS) 318, and an operating system 320. The BIOS 318 includes a set of software instructions that, when executed by the processing system 304, cause the computing device 300 to boot up. The operating system 320 includes a set of software instructions that, when executed by the processing system 304, cause the computing device 300 to provide an operating system that coordinates the activities and sharing of resources of the computing device 300. The memory 302 also stores one or more application programs 322 that, when executed by the processing system 304, cause the computing device 300 to provide applications to users. According to embodiments, application programs 322 may include a point-to-point media search application 307. While executing on processing system 304, application programs 322, such as the point-to-point media search application 307 may perform processes including, for example, one or more method 200's stages as described above. The memory 302 also stores one or more utility programs 324 that, when executed by the processing system 304, cause the computing device 300 to provide utilities to other software programs.

Embodiments of the present invention may be utilized in various distributed computing environments where tasks are performed by remote processing devices that are linked through a communications network in a distributed computing environment.

Figure 4:
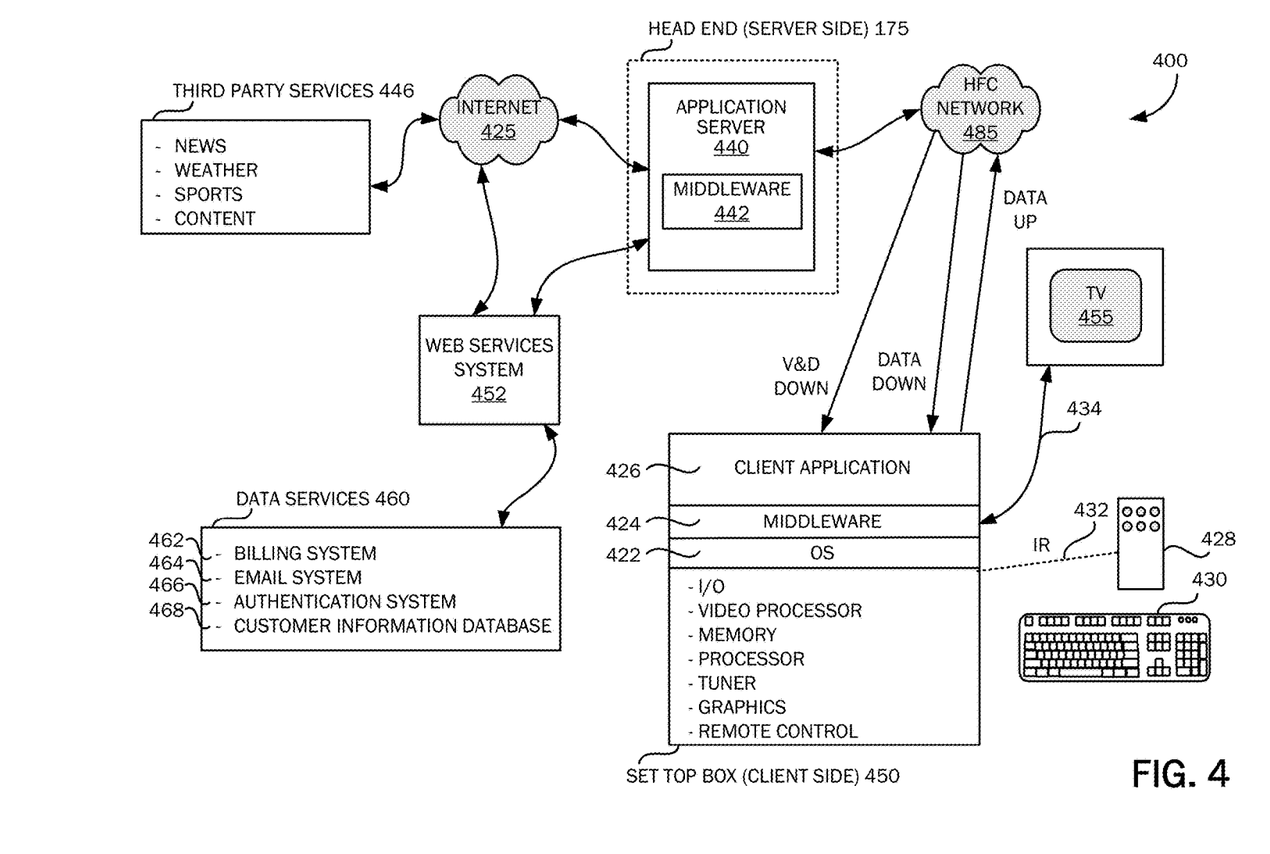
FIG. 4 is a simplified block diagram illustrating a cable television/services system architecture that serves as an exemplary operating environment for the present invention.

FIG. 4 illustrates a cable television/services system architecture 400 that serves as an exemplary operating environment for embodiments of the invention. In FIG. 4, digital and analog video programming, information content and interactive television services are provided via a hybrid fiber coax (HFC) network 485 to a television set 455 for consumption by a cable television/services system customer. As is known to those skilled in the art, HFC networks 485 combine both optical fiber and coaxial cable lines. Typically, optical fiber runs from the cable head end 175 to neighborhoods of 500 to 2,000 customers. Coaxial cable runs from the optical fiber feeders to each customer. According to embodiments of the present invention, the functionality of the HFC network 485 allows for efficient bidirectional data flow between the client-side set-top box 450 and the server-side application server 440 of the present invention.

According to embodiments of the present invention, the CATV system 400 is in the form of a distributed client-server computing system for providing video and data flow across the HFC network 485 between server-side services providers (e.g., cable television/services providers) via a server-side (backend) head end 175 and a client-side customer via a client-side set-top box (STB) functionally connected to a customer receiving device, such as the television set 455. As is understood by those skilled in the art, modern CATV systems 400 may provide a variety of services across the HFC network 485 including traditional digital and analog video programming, telephone services, high speed Internet access, video-on-demand, and information services.

On the client side of the CATV system 400, digital and analog video programming and digital and analog data are provided to the customer television set 455 via the set-top box (STB) 450. Interactive television services that allow a customer to input data to the CATV system 400 likewise are provided by the STB 450. As illustrated in FIG. 4, the STB 450 is a multipurpose computing device having a computer processor, memory and an input/output mechanism. The input/output mechanism of a STB 450 receives input from server-side processes via the HFC network 485 and from customers via input devices such as the remote control device 428 and the keyboard 430. The remote control device 428 and the keyboard 430 may communicate with the STB 450 via a suitable communication transport such as the infrared connection 432. The STB 450 also includes a video processor for processing and providing digital and analog video signaling to the television set 455 via a cable communication transport 434. A multi-channel tuner is provided for processing video and data to and from the STB 450 and the server-side head end system 175, described below.

The STB 450 also includes an operating system 422 for directing the functions of the STB 450 in conjunction with a variety of client applications 426. For example, if a client application 426 requires a news flash from a third-party news source to be displayed on the television 455, the operating system 422 may cause the graphics functionality and video processor of the STB 450, for example, to output the news flash to the television 455 at the direction of the client application 426 responsible for displaying news items.

Because a variety of different operating systems 422 may be utilized by a variety of different brands and types of set-top boxes, a middleware layer 424 is provided to allow a given software application to be executed by a variety of different operating systems. According to an embodiment of the present invention, the middleware layer 424 may include a set of application programming interfaces (API) that are exposed to client applications 426 and operating systems 422 that allow the client applications to communicate with the operating systems through common data calls understood via the API set. As described below, a corresponding middleware layer is included on the server side of the CATV system 400 for facilitating communication between the server-side application server and the client-side STB 450. According to one embodiment of the present invention, search tables may be developed for neighboring STBs which may include previously downloaded media content, location, and the like and may be managed by the middleware layer 424 of the client-side STB 450 and accessed by other STB's for searching and finding the desired on demand media. As should be appreciated, numerous endpoint devices in addition to STBs may be utilized to send and/or receive communications in various operating environments according to various types of transmissions, including media content. For example, wireless telephones, smart phones, tablet computers, wire-line phones, personal computers, laptop computers, network-connected televisions, and the like. According to another embodiment of the present invention, the middleware layer 442 of the server-side application server and the middleware layer 424 of the client-side STB 450 format data passed between the client side and server side according to the Extensible Markup Language (XML). As should be appreciated by those skilled in the art, although some embodiments described in this specification are oriented to middleware installed and executed on a STB 450, alternative embodiments implemented as firmware or as hardware are well within the scope of the present invention.

According to one embodiment, the set-top box 450 passes digital and analog video and data signaling to the television 455 via a one-way communication transport 434. According to other embodiments, two-way communication transports may be utilized, for example, via high definition multimedia (HDMI) ports. The STB 450 may receive video and data from the server side of the CATV system 400 via the HFC network 485 through a video/data downlink and data via a data downlink. The STB 450 may transmit data from the client side of the CATV system 400 to the server side of the CATV system 400 via the HFC network 485 via one data uplink. The video/data downlink is an "in band" downlink that allows for digital and analog video and data signaling from the server side of the CATV system 400 through the HFC network 485 to the set-top box 450 for use by the STB and for distribution to the television set 455. As is understood by those skilled in the art, the "in band" signaling space may operate across a variety of frequency ranges, for example, at a frequency between 54 and 1000 megahertz. The signaling space is generally divided into 6 megahertz channels in which may be transmitted a single analog signal or a greater number (e.g., up to ten) digital signals.

The data downlink and the data uplink, illustrated in FIG. 4, between the HFC network 485 and the set-top box 450 comprise "out of band" data links. As is understand by those skilled in the art, the "out of band" frequency range generally lies between zero and 54 megahertz. According to embodiments of the present invention, data flow between the client-side set-top box 450 and the server-side application server 440 is typically passed through the "out of band" data links. Alternatively, an "in band" data carousel may be positioned in an "in band" channel into which a data feed may be processed from the server-side application server 440 through the HFC network 485 to the client-side STB 450. Operation of data transport between components of the CATV system 400, described with reference to FIG. 4, is well known to those skilled in the art.

Referring still to FIG. 4, the head end 175 of the CATV system 400 is positioned on the server side of the CATV system and includes hardware and software systems responsible for originating and managing content for distributing through the HFC network 485 to client-side STBs 450 for presentation to customers via televisions 455. As described above, a number of services may be provided by the CATV system 400, including digital and analog video programming, interactive television services, telephone services, video-on-demand services, targeted advertising, and provision of information content.

The application server 440 is a general-purpose computing system operative to assemble and manage data sent to and received from the client-side set-top box 450 via the HFC network 485. As described above with reference to the set-top box 450, the application server 440 includes a middleware layer 442 for processing and preparing data from the head end of the CATV system 400 for receipt and use by the client-side set-top box 450. For example, the application server 440 via the middleware layer 442 may obtain data from third-party services 446 via the Internet 425 for transmitting to a customer through the HFC network 485 and the set-top box 450. For example, a weather report from a third-party weather service may be downloaded by the application server via the Internet 425. When the application server 440 receives the downloaded weather report, the middleware layer 442 may be utilized to format the weather report for receipt and use by the set-top box 450. According to one embodiment of the present invention, data obtained and managed by the middleware layer 442 of the application server 440 is formatted according to the Extensible Markup Language and is passed to the set-top box 450 through the HFC network 485 where the XML-formatted data may be utilized by a client application 426 in concert with the middleware layer 424, as described above. As should be appreciated by those skilled in the art, a variety of third-party services data, including news data, weather data, sports data and other information content, may be obtained by the application server 440 via distributed computing environments such as the Internet 425 for provision to customers via the HFC network 485 and the set-top box 450. According to an embodiment of the present invention, digital video recording functionality may be located remotely on the head end (server side) 175, hub server, or neighboring STB, and called upon by a client set-top box 450.

As illustrated in FIG. 4, the services provider data services 460 include a number of services operated by the services provider of the CATV system 400 which may include data on a given customer. For example, a billing system 462 may include information such as a customer's name, street address, business identification number, Social Security number, credit history, and information regarding services and products subscribed to by the customer. An electronic mail system 464 may contain information such as electronic mail addresses, high-speed Internet access subscription information and electronic mail usage data. An authentication system 466 may include information such as secure user names and passwords utilized by customers for access to network services.

A customer information database 468 may include general information about customers such as place of employment, business address, business telephone number, and demographic information such as age, gender, educational level, and the like. The customer information database 468 may also include information on pending work orders for services or products ordered by the customer. The customer information database 468 may also include general customer information such as answers to frequently asked customer questions and contact information for various service provider offices/departments. As should be understood, this information may be stored in a variety of disparate databases operated by the cable services provider.

As should be understood by those skilled in the art, the disparate data services systems 462, 464, 466, 468 are illustrated as a collection of data services for purposes of example only. The example data services systems comprising the data services 460 may operate as separate data services systems, which communicate with a web services system (described below) along a number of different communication paths and according to a number of different communication protocols Referring still to FIG. 4, a web services system 452 is illustrated between the application server 440 and the data services 460. The web services system formulates a data query to each of the available data services systems for obtaining any available data for a given customer as identified by a set-top box identification associated with the customer. The web services system 452 serves as an abstraction layer between the various data services systems and the application server 440. That is, the application server 440 is not required to communicate with the disparate data services systems, nor is the application server 440 required to understand the data structures or data types utilized by the disparate data services systems. The web services system 452 is operative to communicate with each of the disparate data services systems for obtaining necessary customer profile data. The customer data obtained by the web services system is assembled and is returned to the application server 440 for ultimate processing via the middleware layer 442, as described above.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

Further, the disclosed methods' stages may be modified in any manner, including by reordering stages and/or inserting or deleting stages, without departing from the invention. Although embodiments of the present invention have been described with reference to particular standards and protocols, the present invention is not limited to such standards and protocols.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

I claim:

1. A method for providing media content, the method comprising: providing services from a provider to a plurality of subscribers over a network; receiving a request for media content from a device of a subscriber;
   requesting a content table for the device of the subscriber from a first nearest neighboring device of another subscriber;
   receiving the content table from the first nearest neighboring device of the another subscriber over the network of the provider;
   determining if the received content table received from the first nearest neighboring device of the another subscriber includes the requested media content;
   if it is determined that the received content table includes the requested media content, requesting the media content and receiving a stream of the media content from the first nearest neighboring device for consumption by the subscriber; and
   if it is determined that the received content table does not include the requested media content, repeating requesting of a content table from each of a next nearest neighboring device of other subscribers, until the media content is found or until it is determined that the content tables from neighboring devices do not include the requested media content.

2. The method of claim 1 wherein the first nearest neighboring device is a neighboring device nearest to a requesting device according to physical location.

3. The method of claim 2 wherein the requesting device is a set-top box.

4. The method of claim 2 wherein the requesting device includes a wireless telephone, smart phone, tablet computer, personal computer, laptop computer, or a network-connected television.

5. The method of claim 1, further comprising:
   if it is determined that the content tables from neighboring devices of subscribers do not include the requested media content, requesting the media content from a remote hub station server connected on the network to a head end server of the provider.

6. The method of claim 5, further comprising:
   if it is determined that the requested media content is not available from neighboring devices of subscribers or from the remote hub station server, requesting the media content from the head end server.

7. The method of claim 1 wherein media content includes video-on-demand content.

8. The method of claim 1 wherein media content includes video content, audio content, gaming content, or data.

9. The method of claim 1 further comprising storing the received content tables for determining if future media content requests are located on neighboring peer devices.

10. A system for providing media content, the system comprising:
    a first networked device:
    a first nearest neighboring device of another subscriber;
    the first networked device to:
       receive service from a provider over a network for a subscriber; receive a request for media content from the first networked device; request a content table for the first networked device from the first nearest neighboring device of another subscriber;
       receive the content table from the first nearest neighboring device of the another subscriber over the network;
       determine if the received content table received from the first nearest neighboring device of the another subscriber includes the requested media content;
       if it is determined that the received content table includes the requested media content, request the media content and receive the media content from the first nearest neighboring device for consumption by the subscriber; and
       if it is determined that the received content table does not include the requested media content, repeating request of a content table from a next nearest neighboring device of other subscribers, until the media content is found or until it is determined that the content tables from neighboring devices do not include the requested media content.

11. The system of claim 10 wherein the first nearest neighboring device is a neighboring device nearest to the first networked device according to physical location.

12. The system of claim 10 wherein the first networked device is a set-top box.

13. The system of claim 10 wherein the first networked device includes a wireless telephone, smart phone, tablet computer, personal computer, laptop computer, or a network-connected television.

14. The system of claim 10 wherein if it is determined that the content tables from neighboring devices of subscribers do not include the requested media content, the first networked device is further operable to request the media content from a remote hub station server connected on the network to a head end server of the provider.

15. The system of claim 14 wherein if it is determined that the requested media content is not available from neighboring devices of subscribers or from the remote hub station server, the first networked device is further operable to request the media content from the head end server.

16. The system of claim 10 wherein media content includes video-on-demand content.

17. The system of claim 10 wherein media content includes video content, audio content, gaming content, or data.

18. A computer readable storage device containing computer executable instructions which when executed by a computer provide a method for providing media content, the method comprising:

receiving services from a provider to a subscriber over a network; receiving a request for media content from a device of the subscriber; requesting a content table for the device of the subscriber from a first nearest neighboring device of another subscriber;

receiving the content table from the first nearest neighboring device of the another subscriber over the network of the provider; storing the content table;

determining if the received content table received from the first nearest neighboring device of the another subscriber includes the requested media content;

if it is determined that the received content table from the first nearest neighboring peer node includes the requested media content, requesting the media content and receiving a stream of the media content from the first nearest neighboring device for consumption by the subscriber;

if it is determined that the received content table from the first nearest neighboring device does not include the requested media content, repeating requesting of a content table from a next nearest neighboring device of other subscribers, until the media content is found or until it is determined that the content tables from neighboring devices do not include the requested media content;

if it is determined that the content tables from neighboring devices do not include the requested media content, requesting the media content from a remote hub station server connected on the network to a head end server of the provider; and if it is determined that the requested media content is net available from neighboring peer devices or from the remote hub station server, requesting the media content from the head end server.

19. The computer readable storage device of claim 18, wherein the first nearest neighboring device is a neighboring device nearest to a requesting device according to physical location, and wherein the requesting device includes a set-top box, a wireless telephone, a smart phone, a tablet computer, a personal computer, a laptop computer, or a network-connected television.

20. The computer readable storage device of claim 18, wherein media content includes video content, audio content, gaming content, or data.

* * * * *